US012347952B2

(12) United States Patent
Lin

(10) Patent No.: US 12,347,952 B2
(45) Date of Patent: Jul. 1, 2025

(54) CONNECTOR ASSEMBLY WITH IMPROVED MATING RELIABILITY

(71) Applicant: DONGGUAN LUXSHARE TECHNOLOGIES CO., LTD, Dongguan (CN)

(72) Inventor: Yanbo Lin, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 0 days.

(21) Appl. No.: 18/658,191

(22) Filed: May 8, 2024

(65) Prior Publication Data

US 2024/0291186 A1 Aug. 29, 2024

Related U.S. Application Data

(63) Continuation of application No. 17/581,560, filed on Jan. 21, 2022, now Pat. No. 12,088,028.

(30) Foreign Application Priority Data

Mar. 10, 2021 (CN) ......................... 202110257871.1

(51) Int. Cl.
*H01R 12/71* (2011.01)
*H01R 12/70* (2011.01)
(Continued)

(52) U.S. Cl.
CPC ....... *H01R 12/716* (2013.01); *H01R 12/7005* (2013.01); *H01R 12/7023* (2013.01);
(Continued)

(58) Field of Classification Search
CPC .............. H01R 12/716; H01R 12/7005; H01R 12/7023; H01R 13/42; H01R 13/516;
(Continued)

(56) References Cited

U.S. PATENT DOCUMENTS 6,338,631 B1 * 1/2002 Hashimoto .......... H01R 12/727 439/67
2006/0128192 A1 6/2006 Wang
(Continued)

FOREIGN PATENT DOCUMENTS

CN 102447202 A 5/2012
CN 202737156 U 2/2013
(Continued)

OTHER PUBLICATIONS

U.S. Office Action issued in U.S. Appl. No. 17/581,560, mailed Mar. 15, 2024.

*Primary Examiner* — Justin M Kratt
(74) *Attorney, Agent, or Firm* — Birch, Stewart, Kolasch & Birch, LLP

(57) ABSTRACT

A connector assembly includes a first connector and a second connector. The first connector includes a first insulating body, a number of first conductive terminals, and an adapter circuit board. The adapter circuit board includes an input end and an output end. The input end includes an input portion electrically connected to the first conductive terminals. The output end includes an insertion portion protruding beyond the first insulating body. The second connector includes a second insulating body and a number of second conductive terminals. The first connector and the second connector further include locking structures to prevent the first connector from being separated from the second connector.

18 Claims, 17 Drawing Sheets

(51) Int. Cl.

| | |
|---|---|
| ***H01R 12/72*** | (2011.01) |
| ***H01R 13/42*** | (2006.01) |
| ***H01R 13/516*** | (2006.01) |
| ***H01R 13/627*** | (2006.01) |
| ***H01R 13/629*** | (2006.01) |
| ***H01R 13/639*** | (2006.01) |
| ***H01R 24/54*** | (2011.01) |
| ***H01R 31/06*** | (2006.01) |
| ***H01R 33/90*** | (2006.01) |
| *H01R 12/73* | (2011.01) |
| *H01R 12/75* | (2011.01) |
| *H01R 13/518* | (2006.01) |
| *H01R 24/00* | (2011.01) |
| *H01R 33/94* | (2006.01) |

(52) U.S. Cl.
CPC ........... *H01R 12/721* (2013.01); *H01R 13/42* (2013.01); *H01R 13/516* (2013.01); *H01R 13/627* (2013.01); *H01R 13/6271* (2013.01); *H01R 13/629* (2013.01); *H01R 13/639* (2013.01); *H01R 24/54* (2013.01); *H01R 24/542* (2013.01); *H01R 31/06* (2013.01); *H01R 33/90* (2013.01); *H01R 12/7011* (2013.01); *H01R 12/7017* (2013.01); *H01R 12/7076* (2013.01); *H01R 12/71* (2013.01); *H01R 12/712* (2013.01); *H01R 12/737* (2013.01); *H01R 12/75* (2013.01); *H01R 13/518* (2013.01); *H01R 13/6272* (2013.01); *H01R 24/00* (2013.01); *H01R 24/545* (2013.01); *H01R 24/547* (2013.01); *H01R 31/065* (2013.01); *H01R 33/94* (2013.01)

(58) Field of Classification Search
CPC ......................... H01R 13/627; H01R 13/6271; H01R 13/629; H01R 13/639; H01R 24/54; H01R 24/542; H01R 31/06; H01R 33/90; H01R 12/7011; H01R 12/7017; H01R 12/7076; H01R 12/71; H01R 12/712; H01R 12/737; H01R 12/75; H01R 13/518; H01R 13/6272; H01R 24/00; H01R 31/065; H01R 33/94; H01R 24/545; H01R 24/547
See application file for complete search history.

(56) References Cited

U.S. PATENT DOCUMENTS

| | | | | |
|---|---|---|---|---|
| 2010/0261384 | A1 | 10/2010 | Zhang | |
| 2017/0133778 | A1 | 5/2017 | Oberski et al. | |
| 2020/0076132 | A1* | 3/2020 | Yang ...................... | H01R 12/73 |
| 2021/0408727 | A1* | 12/2021 | Fan .................... | H01R 13/6275 |

FOREIGN PATENT DOCUMENTS

| | | | |
|---|---|---|---|
| CN | 104037550 | A | 9/2014 |
| CN | 108808380 | A | 11/2018 |
| JP | 11-339909 | A | 12/1999 |
| JP | 2002-9326 | A | 1/2002 |
| JP | 2003-59589 | A | 2/2003 |
| JP | 2006-67445 | A | 3/2006 |
| JP | 2008-97956 | A | 4/2008 |
| JP | 2008-277035 | A | 11/2008 |
| JP | 2011-86544 | A | 4/2011 |
| TW | M475714 | U | 4/2014 |
| WO | WO 2014/024982 | A1 | 2/2014 |

* cited by examiner

CONNECTOR ASSEMBLY WITH IMPROVED MATING RELIABILITY

CROSS-REFERENCE TO RELATED APPLICATIONS

The present disclosure is a continuation of U.S. patent application Ser. No. 17/581,560, filed on Jan. 21, 2022, which claims priority of a Chinese Patent Application No. 202110257871.1, filed on Mar. 10, 2021 and titled "CONNECTOR ASSEMBLY", the entire content of which is incorporated herein by reference.

TECHNICAL FIELD

The present disclosure relates to a connector assembly which belongs to a technical field of connectors.

BACKGROUND

An existing connector assembly usually includes a first connector and a second connector which are mated with each other. The first connector usually includes a first insulating body and a plurality of first conductive components. The second connector usually includes a second insulating body, a plurality of second conductive components, and a receiving slot for at least partially receiving the first connector. After the first connector is inserted into the receiving slot of the second connector, the first conductive components and the second conductive components are electrically connected.

According to different use environments and structural designs of the connector assembly, when the first conductive components and the second conductive components achieve electrical conduction, the reliability of the mutual positional relationship between the first connector and the second connector needs to be maintained. Therefore, how to avoid contact loosening of the connector assembly due to external force, or even damage to the components of the connector or the connection position of the connector and other components, is a technical problem that needs to be solved by those skilled in the art.

SUMMARY

An object of the present disclosure is to provide a connector assembly with improved mating reliability.

In order to achieve the above object, the present disclosure adopts the following technical solution: a connector assembly, including: a first connector and a second connector which are configured to mate with each other; the first connector including: a first insulating body, the first insulating body including a first mating surface and a first mating slot extending through the first mating surface along a first direction, the first mating slot being configured to receive a mating element along a mating direction which is opposite to the first direction; a plurality of first conductive terminals, each first conductive terminal including a first elastic arm and a first tail portion, the first elastic arm including a first mating portion extending into the first mating slot to be electrically connected with the mating element; and an adapter circuit board, the adapter circuit board including an input end and an output end, the input end including an input portion electrically connected to the first tail portions of the first conductive terminals, the output end including an insertion portion protruding beyond the first insulating body along a second direction which is perpendicular to the first direction; the output end further including an output portion and a plurality of cables directly or indirectly electrically connected with the output portion; the second connector including: a second insulating body, the second insulating body including a second mating surface and a second mating slot extending through the second mating surface, the insertion portion being configured to be inserted into the second mating slot along the second direction; a plurality of second conductive terminals, each second conductive terminal including a second mating portion extending into the second mating slot, the second mating portion being configured to electrically contact with the insertion portion; and a metal shell, the metal shell at least partially covering the second insulating body, the metal shell including a first wall portion, a second wall portion located opposite to the first wall portion, a third wall portion, a fourth wall portion located opposite to the third wall portion, and a receiving cavity formed by the first wall portion, the second wall portion, the third wall portion and the fourth wall portion; the receiving cavity being in communication with the second mating slot to at least partially receive the first connector; wherein when the first connector and the second connector are mated with each other, the plurality of cables extend beyond the third wall portion along the mating direction; and the first insulating body extends beyond the fourth wall portion along the first direction with the first mating surface protruding out of fourth wall portion along the first direction; and wherein the first connector and the second connector further include locking structures which are lockable with each other to prevent the first connector from detaching from the second connector in a direction opposite to the second direction.

In order to achieve the above object, the present disclosure adopts the following technical solution: a connector assembly, including: a first connector and a second connector configured to mate with each other; the first connector including: a first insulating body, the first insulating body defining a first mating slot configured to receive an electronic card; a plurality of first conductive terminals, each first conductive terminal including a first mating portion extending into the first mating slot to mate with the electronic card; and an adapter circuit board, the adapter circuit board including an input end and an output end, the input end including an input portion electrically connected to the first conductive terminals, the output end including an insertion portion, an output portion and a plurality of cables, the cables being directly or indirectly electrically connected with the output portion in order to transmit high-speed signals; the second connector including: a second insulating body, the second insulating body defining a second mating slot to receive the insertion portion; and a plurality of second conductive terminals, each second conductive terminal including a second mating portion extending into the second mating slot, the second mating portion being in electrical contact with the insertion portion in order to transmit non-high-speed signals; wherein the first connector and the second connector further include locking structures mated with each other, the locking structures include a locking hole and a locking protrusion, one of the locking hole and the locking protrusion is provided on the first connector, a remaining one of the locking hole and the locking protrusion is provided on the second connector, the locking protrusion is lockable in the locking hole.

Compared with the prior art, the present disclosure is capable of preventing the first connector from separating from the second connector in a direction opposite to the second direction by providing interlocking locking structures, thereby improving the mating reliability of the connector assembly. Besides, the locking structures can also structurally strengthen the first connector and the second connector to resist against a tilt that may be caused when the mating element is inserted into the first mating slot along the first direction, as well as a tilt that may be caused by the gravity of the plurality of cables.

DETAILED DESCRIPTION

Figure 1:
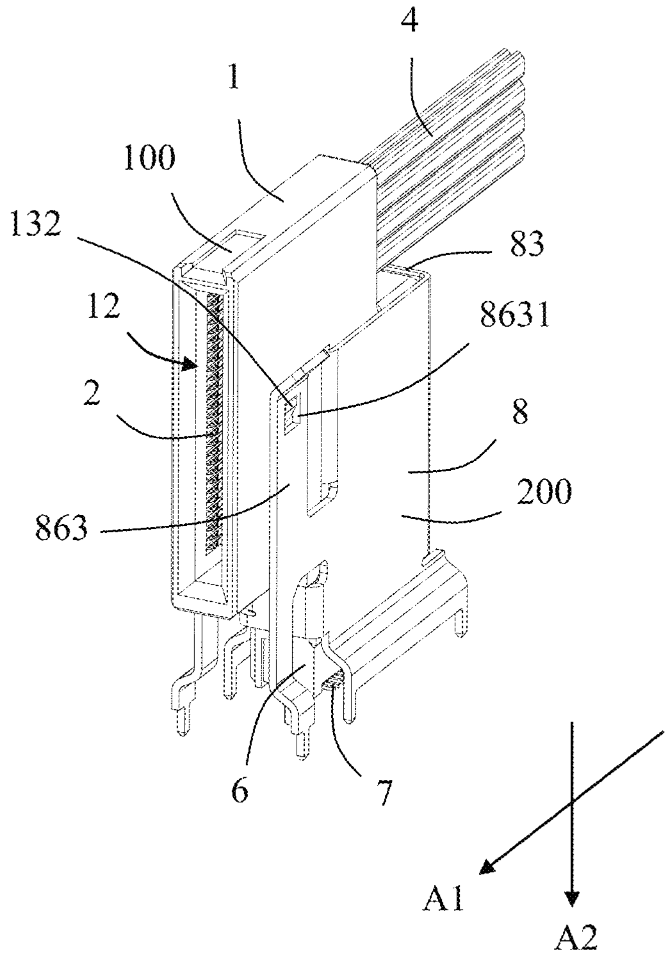
FIG. 1 is a perspective schematic view of a connector assembly in accordance with a first embodiment of the present disclosure.
Figure 2:
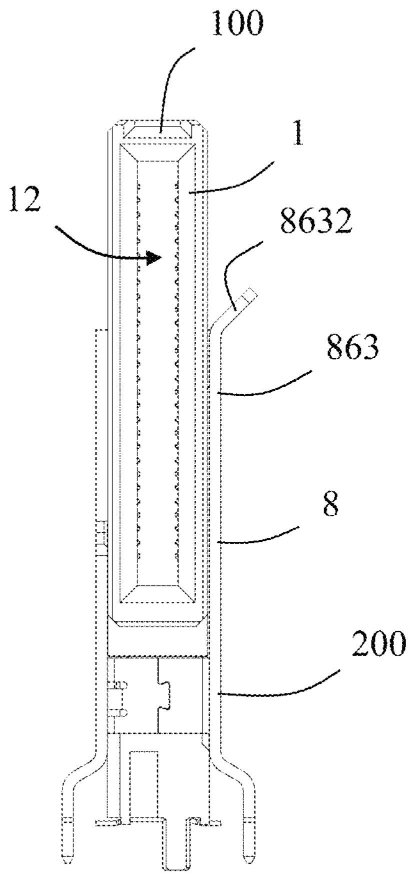
FIG. 2 is a front view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 7, illustrated embodiments of the present disclosure disclose a connector assembly including a first connector 100 and a second connector 200 which are mated with each other. In the illustrated embodiments of the present disclosure, the first connector 100 is adapted to receive a mating element (such as an electronic card, not shown). The second connector 200 is adapted for being mounted on a bottom circuit board (not shown).

Figure 8:
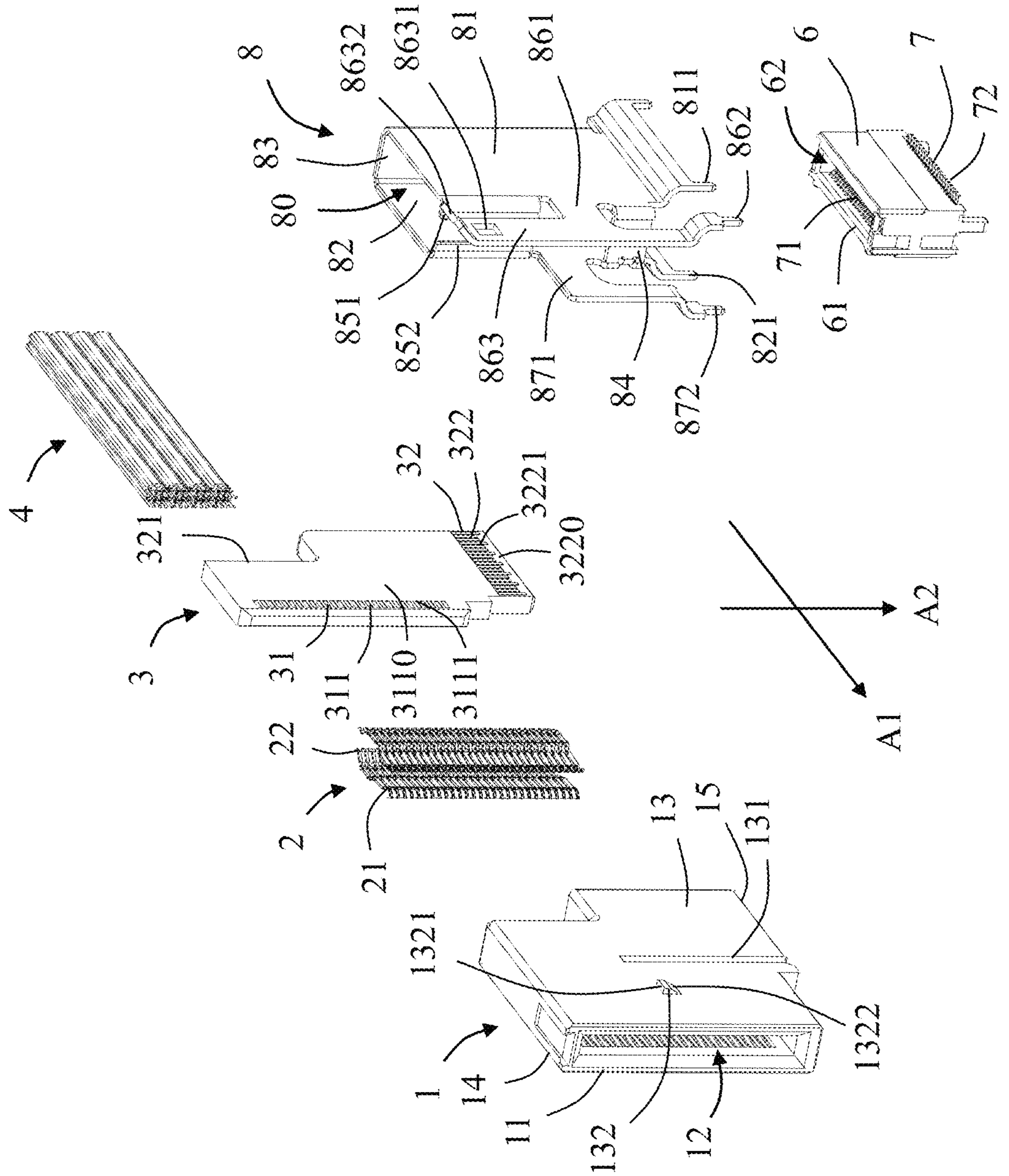
FIG. 8 is a further perspective exploded view of the connector assembly in FIG. 1.

Referring to FIG. 8, the first connector 100 includes a first insulating body 1, a plurality of first conductive terminals 2 fixed to the first insulating body 1, an adapter circuit board 3 electrically connected to the first conductive terminals 2, and cables 4 which are directly or indirectly electrically connected to the adapter circuit board 3 to transmit high-speed signals. In the illustrated embodiment of the present disclosure, the first insulating body 1 covers a part of the adapter circuit board 3 in order to improve the structural strength of the first connector 100.

Figure 5:
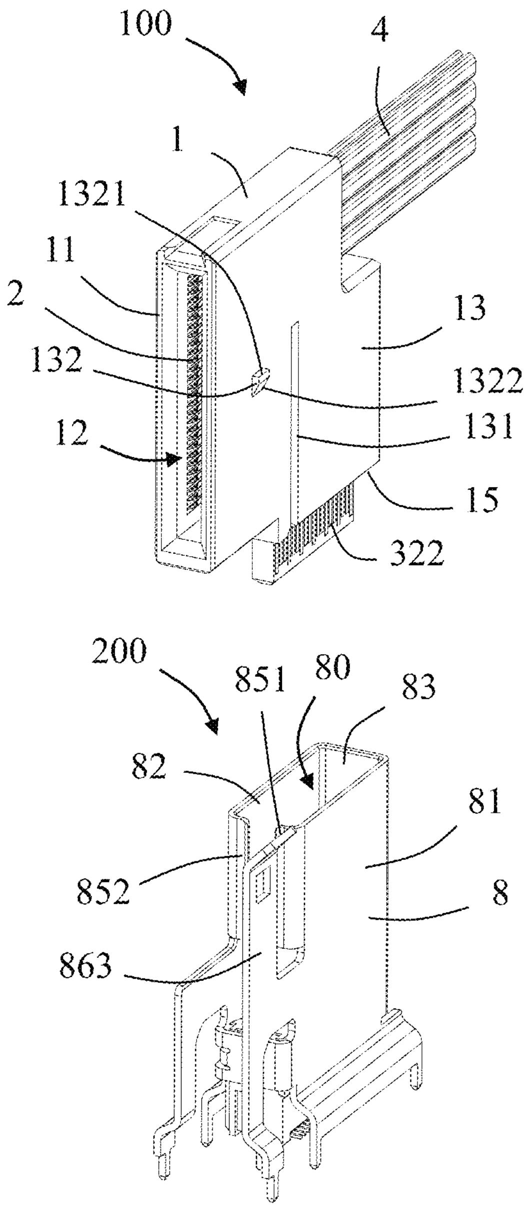
FIG. 5 is a partial perspective exploded view of the connector assembly in FIG. 1, in which the first connector and the second connector are separated from each other.
Figure 6:
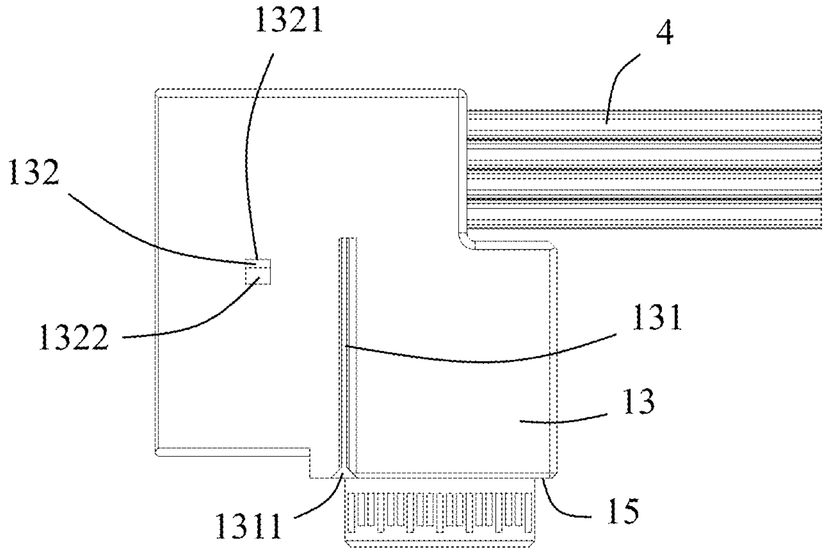
FIG. 6 is a right side view of FIG. 5.
Figure 6:
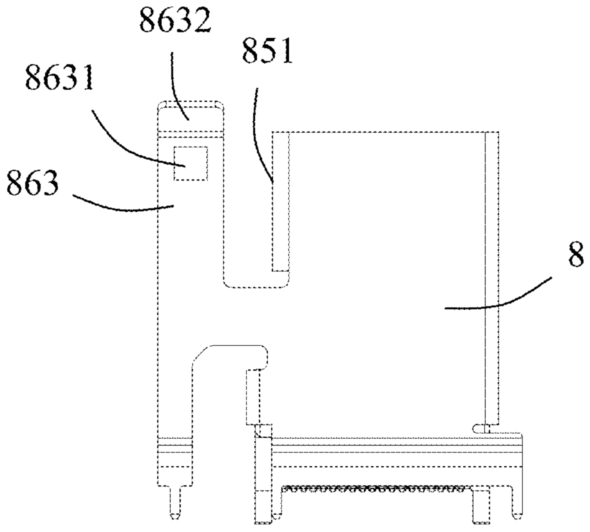
Figure 7:
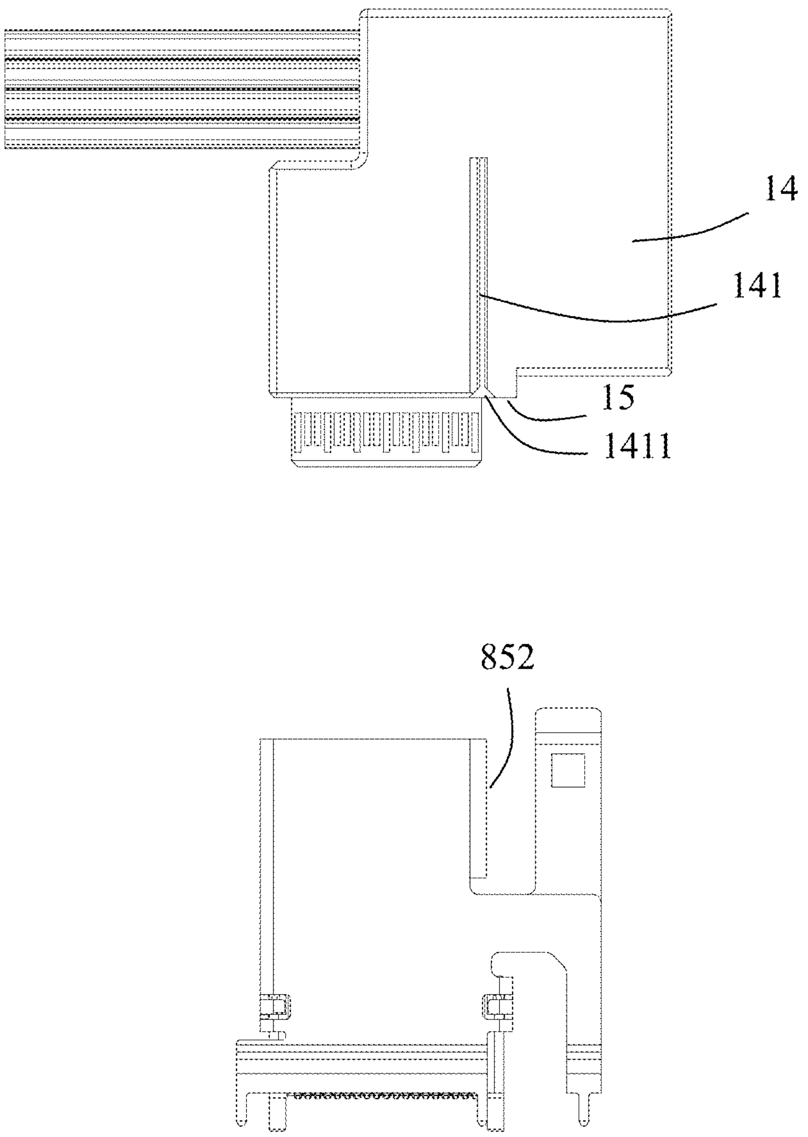
FIG. 7 is a left side view of FIG. 5.

Referring to FIGS. 5 to 7, the first insulating body 1 includes a first mating surface 11, a first mating slot 12 extending through the first mating surface 11 along a first direction A1, a first side wall 13 (for example, a right side wall) located on one side of the first mating slot 12, a second side wall 14 (for example, a left side wall) located on the other side of the first mating slot 12, and a bottom wall 15 located at the bottom of the first insulating body 1. The first mating slot 12 is adapted for inserting the electronic card. Referring to FIG. 8, in the illustrated embodiment of the present disclosure, the first direction A1 is a direction from right to left.

In the first embodiment of the first connector 100 of the present disclosure, the first side wall 13 includes a first slot 131 extending along a second direction A2 and a first locking protrusion 132 protruding away from the second side wall 14. In the illustrated embodiment of the present disclosure, the second direction A2 is a direction from top to bottom. The second direction A2 is perpendicular to the first direction A1. The first slot 131 extends downwardly through the bottom wall 15. The first slot 131 includes a first bell mouth 1311 at a bottom end to guide the second connector 200. The first locking protrusion 132 includes a first locking surface 1321 and a first guiding surface 1322 which is disposed obliquely. In other words, as shown in FIGS. 5 and 8, the first guiding surface 1322 is an inclined guiding surface for guiding insertion of the second connector 200.

Referring to FIGS. 6 and 7, the second side wall 14 includes a second slot 141 extending along the second direction A2. The second slot 141 extends downwardly through the bottom wall 15. The second slot 141 includes a second bell mouth 1411 at a bottom end to guide the second connector 200. In an embodiment of the present disclosure, the first slot 131 and the second slot 141 are symmetrically disposed on left and right sides of the first mating slot 12.

In the illustrated embodiment of the present disclosure, the first conductive terminals 2 are in two rows arranged left and right. Each first conductive terminal 2 includes a first mating portion 21 extending into the first mating slot 12 and a first tail portion 22 for electrically connecting with the adapter circuit board 3. The first mating portion 21 and the first tail portion 22 are located at opposite ends of the first conductive terminal 2, respectively. The first mating slot 12 is adapted for insertion of the electronic card. The electronic card includes a plurality of golden fingers (not shown), and the first mating portions 21 are in contact with the golden fingers. In an embodiment of the present disclosure, the gold fingers of the electronic card are in two rows and are located on two opposite surfaces of the electronic card, respectively. The first mating portion 21 has a certain degree of elasticity. By providing two rows of first conductive terminals 2, the first mating portions 21 of the two rows of first conductive terminals 2 can provide a certain force to clamp the electronic card. Therefore, the electronic card can be better held in the first mating slot 12, and the risk of loosening of the electronic card can be reduced. In the illustrated embodiment of the present disclosure, the first tail portion 22 also has a certain degree of elasticity, so as to clamp the adapter circuit board 3, so that the first tail portions 22 and the adapter circuit board 3 can achieve better electrical connection. Of course, in other embodiments, the first conductive terminals 2 may also be arranged in a row. Correspondingly, the electronic card includes a row of golden fingers.

Figure 3:
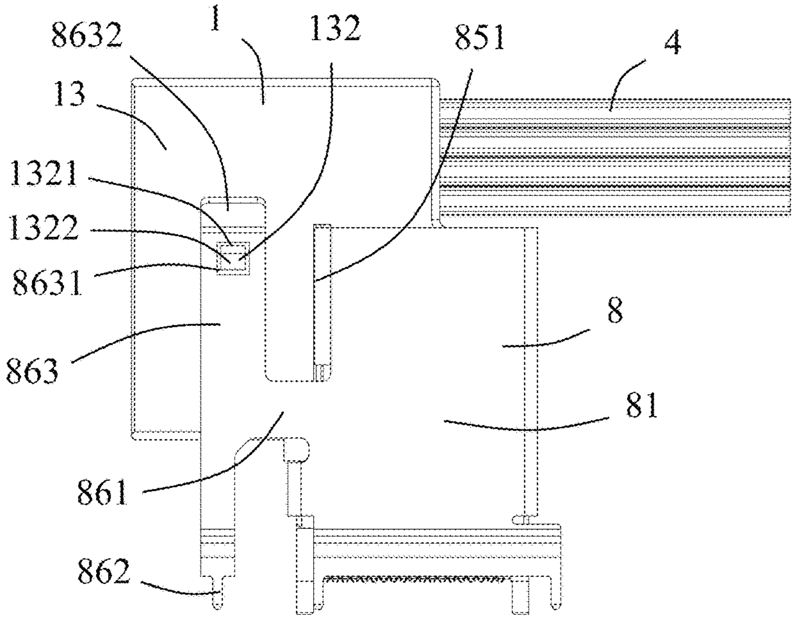
FIG. 3 is a right side view of FIG. 1.
Figure 4:
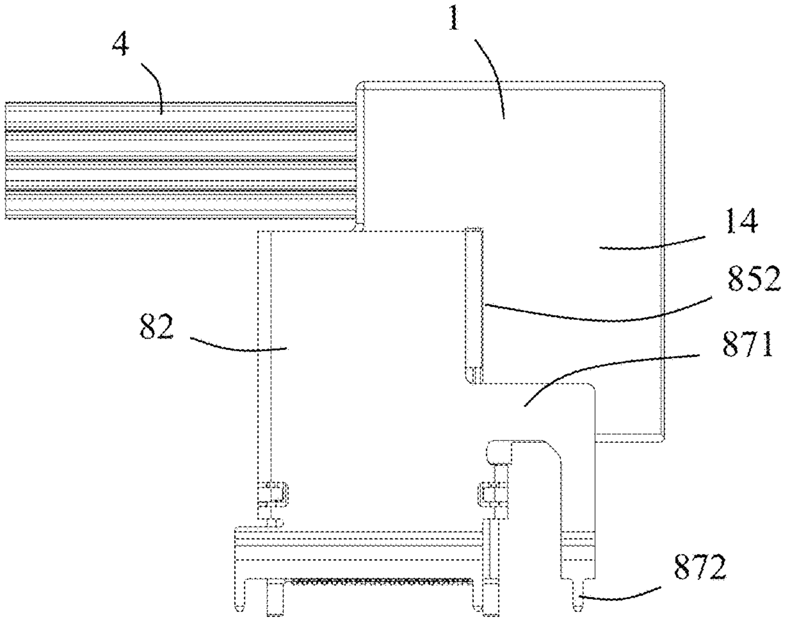
FIG. 4 is a left side view of FIG. 1.

Referring to FIGS. 3 to 5, in an embodiment of the present disclosure, the adapter circuit board 3 includes an input end 31 and an output end 32. The input end 31 includes an input portion 311 for electrically connecting with the first conductive terminals 2. The output end 32 includes an output portion 321 and an insertion portion 322 for being inserted into the second connector 200. The output portion 321 is adapted to directly or indirectly electrically connect with the cables 4 to transmit high-speed signals.

In the embodiment shown in FIG. 8 of the present disclosure, the input portion 311 extends along the first direction A1 and is located on a left side of the adapter circuit board 3. The insertion portion 322 extends along the second direction A2 and is located at a bottom of the adapter circuit board 3. The output portion 321 is located on a right side of the input portion 311 and on top of the insertion portion 322.

The input portion 311 has a plurality of first conductive pads 3111 for electrically connecting with the first tail portions 22 of the first conductive terminals 2. In the illustrated embodiment of the present disclosure, the input portion 311 includes two first side surfaces 3110 arranged oppositely. The first conductive pads 3111 are provided on the two first side surfaces 3110. The first conductive pads 3111 extend along the first direction A1. The first conductive pads 3111 on each side are spaced up and down along a direction parallel to the second direction A2. The first tail portions 22 can be electrically connected to the first conductive pads 3111 by abutting. Of course, in other embodiments, the first tail portions 22 may also be electrically connected to the first conductive pads 3111 by soldering.

The insertion portion 322 extends downwardly beyond the bottom wall 15 of the first insulating body 1. The insertion portion 322 has a plurality of second conductive pads 3221 for electrically connecting with the second connector 200. The insertion portion 322 includes two second side surfaces 3220 arranged oppositely. The second conductive pads 3221 are provided on the two second side surfaces 3220. The second conductive pads 3221 extend along the second direction A2. The second conductive pads 3221 on each side are arranged at left and right intervals along a direction parallel to the first direction A1.

Figure 9:
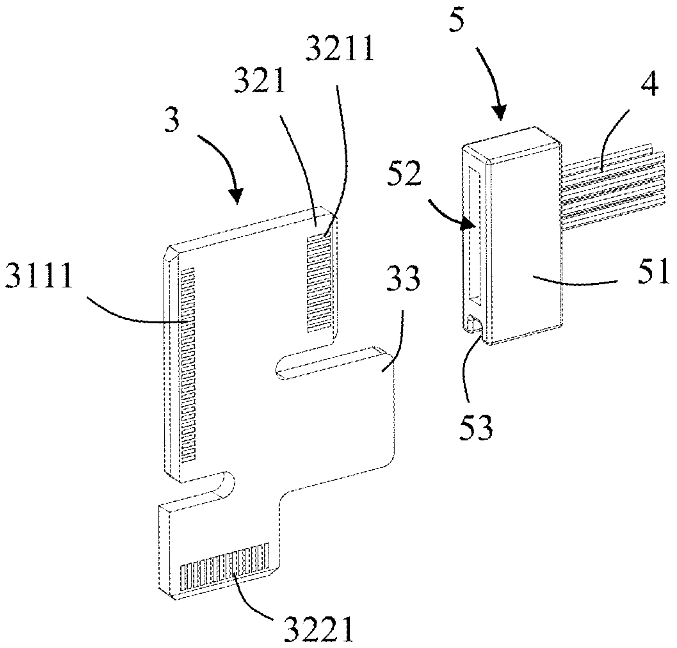
FIG. 9 is a perspective schematic view of an adapter circuit board and cables in another embodiment in FIG. 8.

The output portion 321 has a plurality of conductive components (for example, third conductive pads 3211 shown in FIG. 9). The conductive components are fixedly connected to the cables 4. For example, the conductive components and the cables 4 are fixed by soldering. Of course, in other embodiments, the conductive components and the cables 4 can also be fixed by means of glue dispensing or the like. The cables 4 may be parallel to the first direction A1; or the cables 4 may be perpendicular to the first direction A1; or there is an included angle between each cable 4 and the first direction A1.

In another embodiment of the adapter circuit board 3 of the present disclosure, the output portion 321 is adapted for being inserted into an adapter connector 5. The output portion 321 extends in a direction opposite to the first direction A1. The output portion 321 has a plurality of third conductive pads 3211. The output portion 321 includes two third side surfaces 3210 arranged oppositely. The third conductive pads 3211 are provided on the two third side surfaces 3210.

Referring to FIG. 9, the adapter connector 5 includes a third insulating body 51, a plurality of third conductive terminals (not shown) fixed to the third insulating body 51, and the cables 4. The third conductive pads 3211 are adapted for electrically connecting with one end of the third conductive terminals. The cables 4 are adapted to be fixedly connected to the other end of the third conductive terminals. For example, the third conductive terminals and the cables 4 are fixed by soldering, riveting, or dispensing. The third insulating body 51 includes a third mating slot 52 for receiving the output portion 321 and a positioning slot 53 located below the third mating slot 52. The adapter circuit board 3 includes a positioning tab 33 that is matched with the positioning slot 53. After the output portion 321 is inserted into the third mating slot 52, the third conductive terminals abut against the third conductive pads 3211, in order to realize the electrical connection between the third conductive pads 3211 and the cables 4.

It should be noted that the position of the output portion 321 may be set at other positions than the insertion portion 322. The connection mode or connection angle of the cables 4 and the conductive components can be flexibly adjusted according to actual needs, which is not limited in the present disclosure.

In an embodiment of the present disclosure, the number of the first conductive pads 3111 is equal to the sum of the number of the second conductive pads 3221 and the number of the conductive components. Some signals (for example, non-high-speed signals) of the signals input from the input portion 311 communicate with the bottom circuit board through the electrical connection between the insertion portion 322 and the second connector 200. Some other signals (for example, high-speed signals) communicate with the cables 4 through the conductive components on the output portion 321. Compared with the prior art, by arranging the cables 4 to transmit the high-speed signals, signal integrity of the high-speed signals during transmission is improved, thereby improving the quality of data transmission. In addition, the design of the adapter circuit board 3 disclosed in the present disclosure is also beneficial to simplify the arrangement of the second conductive pads 3221 and the conductive components on the adapter circuit board 3. By arranging the second conductive pads 3221 and the conductive components at different positions on the adapter circuit board 3, the arrangement density of the second conductive pads 3221 and the conductive components is reduced, which is beneficial to realize the miniaturization of the adapter circuit board 3.

Figure 10:
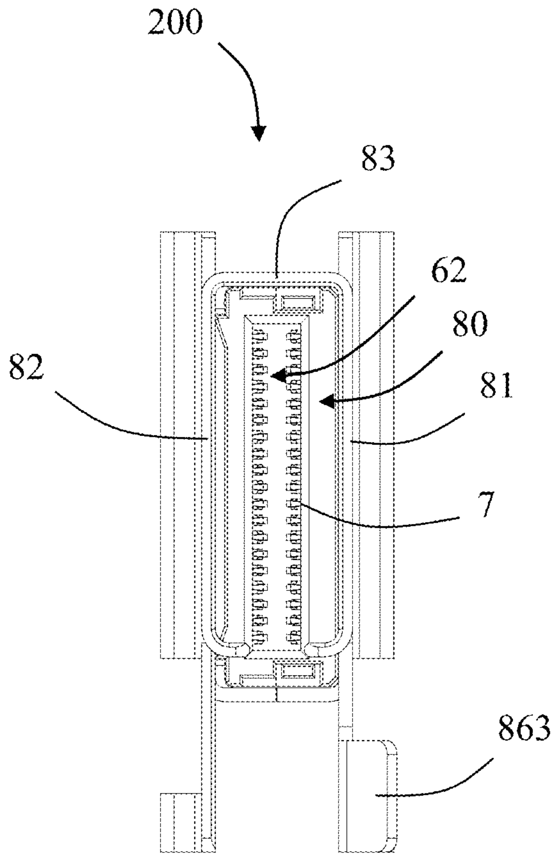
FIG. 10 is a top view of the second connector in FIG. 5.

Referring to FIGS. 8 and 10, the second connector 200 includes a second insulating body 6, a plurality of second conductive terminals 7 fixed to the second insulating body 6, and a metal shell 8 enclosing the second insulating body 6. The second insulating body 6 includes a second mating surface 61 and a second mating slot 62 extending through the second mating surface 61. The insertion portion 322 is inserted into the second mating slot 62 along the second direction A2. Each second conductive terminal 7 includes a second mating portion 71 extending into the second mating slot 62 and a second tail portion 72 for fixing to the bottom circuit board. In an embodiment of the present disclosure, the second conductive terminals 7 are disposed in two rows. The two rows of second conductive terminals 7 can provide a certain clamping force to the insertion portion 322 of the adapter circuit board 3, so that the insertion portion 322 can be better held in the second mating slot 62. This improves the mating reliability of the first connector 100 and the second connector 200.

The metal shell 8 includes a first wall portion 81, a second wall portion 82 opposite to the first wall portion 81, a connecting portion 83 connecting the first wall portion 81 and the second wall portion 82, a buckling portion 84 which buckles the first wall portion 81 and the second wall portion 82 together, and a receiving cavity 80 located between the first wall portion 81 and the second wall portion 82. In an embodiment of the present disclosure, the metal shell 8 is formed by stamping, bending and buckling a metal piece. Buckling structures (for example, dovetail grooves and protrusions that cooperate with each other) are provided on the buckling portion 84. The buckling portion 84 and the connecting portion 83 are located on opposite sides of the receiving cavity 80. The height of the buckling portion 84 is lower than the height of the connecting portion 83. The first wall portion 81, the second wall portion 82, the connecting portion 83, and the buckling portion 84 enclose the outer wall of the second insulating body 6 to achieve the mutual fixation of the metal shell 8 and the second insulating body 6.

Specifically, the first wall portion 81 includes a first mounting foot 811 extending downwardly and to a side away from the second wall portion 82. The second wall portion 82 includes a second mounting foot 821 extending downwardly and to a side away from the first wall portion 81. The first mounting foot 811 and the second mounting foot 821 are adapted for being mounted on the bottom circuit board. In the illustrated embodiment of the present disclosure, in order to further improve the structural strength, the heights of the first wall portion 81, the second wall portion 82, and the connecting portion 83 are designed as high as possible. The height of the connecting portion 83 is the same as the height of the first wall portion 81 and the height of the second wall portion 82.

The metal shell 8 further includes a first tab 851 bent from the first wall portion 81 toward the second wall portion 82, and a second tab 852 bent from the second wall portion 82 toward the first wall portion 81. The metal shell 8 further includes a first extension portion 861 extending forwardly from the first wall portion 81, a first extension foot 862 extending downwardly from the first extension portion 861, and a first elastic locking arm 863 extending upwardly from the first extension portion 861. The metal shell 8 further includes a second extension portion 871 extending forwardly from the second wall portion 82 and a second extension foot 872 extending downwardly from the second extension portion 871. The first extension foot 862 and the second extension foot 872 are adapted for being mounted to the bottom circuit board.

In the illustrated embodiment of the present disclosure, the first elastic locking arm 863 has a cantilever shape, and includes a first locking hole 8631 and a first inclined portion 8632 located at a free end (i.e., a top end) of the first elastic locking arm 863. The first inclined portion 8632 extends obliquely away from the second wall portion 82. The first locking hole 8631 is adjacent to the first inclined portion 8632.

When the first connector 100 is mated with the second connector 200, the first tab 851 and the second tab 852 are inserted into the first slot 131 and the second slot 141 under the guidance of the first bell mouth 1311 and the second bell mouth 1411, respectively. The first elastic locking arm 863 changes the relative position of the first locking protrusion 132 along the first guiding surface 1322 of the first locking protrusion 132.

When the first connector 100 and the second connector 200 are mated in place, the first elastic locking arm 863 rebounds, so that the first locking protrusion 132 is locked in the first locking hole 8631. A portion of the first elastic locking arm 863 located at an upper edge of the first locking hole 8631 can be abutted against the first locking surface 1321 in a vertical direction in order to prevent the first connector 100 from being improperly separated from the second connector 200 in a direction opposite to the second direction A2. At the same time, the insertion portion 322 of the first connector 100 and a part of the first insulating body 1 are received in the second connector 200; the insertion portion 322 is inserted into the second mating slot 62 to achieve an electrical connection with the second conductive terminals 7; and a part of the first insulating body 1 is received in the receiving cavity 80.

When in use, the mating element (such as the electronic card) is inserted into the first mating slot 12 along a direction opposite to the first direction A1, which will impose an insertion force along the first direction A1 to the first connector 100. In the illustrated embodiment of the present disclosure, the first tab 851 and the second tab 852 are fixed and positioned in the first slot 131 and the second slot 141, respectively, which improves the integrity of the connector assembly and reduces the possible adverse effects of the insertion force on the connector assembly. In addition, by elevating the first wall portion 81, the second wall portion 82 and the connecting portion 83, the connecting portion 83 can better stop the first connector 100, thereby further reducing the possible adverse effect of the insertion force on the connector assembly. For example, the insertion force reduces the risk of loosening at the soldering position of the second connector 200 and the bottom circuit board, and also reduces the risk of poor contact between the conductive components of the insertion portion 322 and the second conductive terminals 7.

When unlocking is required, the first inclined portion 8632 is opened outwardly to make the first locking protrusion 132 escape from the first locking hole 8631. Then, by applying a force opposite to the second direction A2, the first connector 100 can be withdrawn from the second connector 200.

Figure 11:
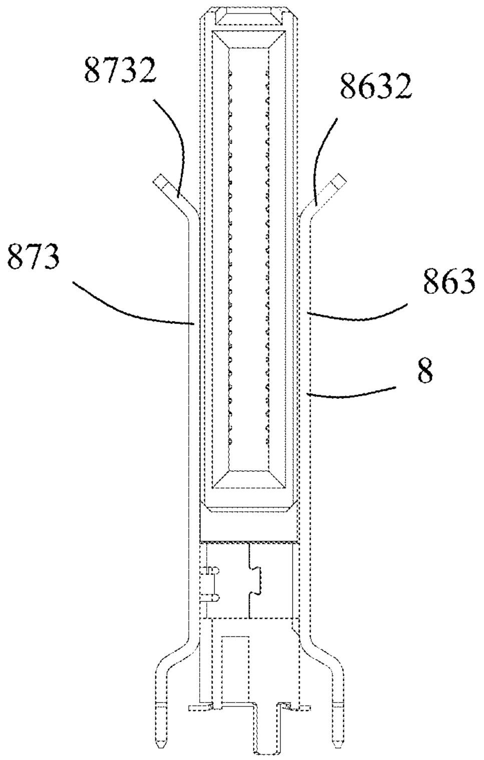
FIG. 11 is a front view of the connector assembly in accordance with a second embodiment of the present disclosure.
Figure 12:
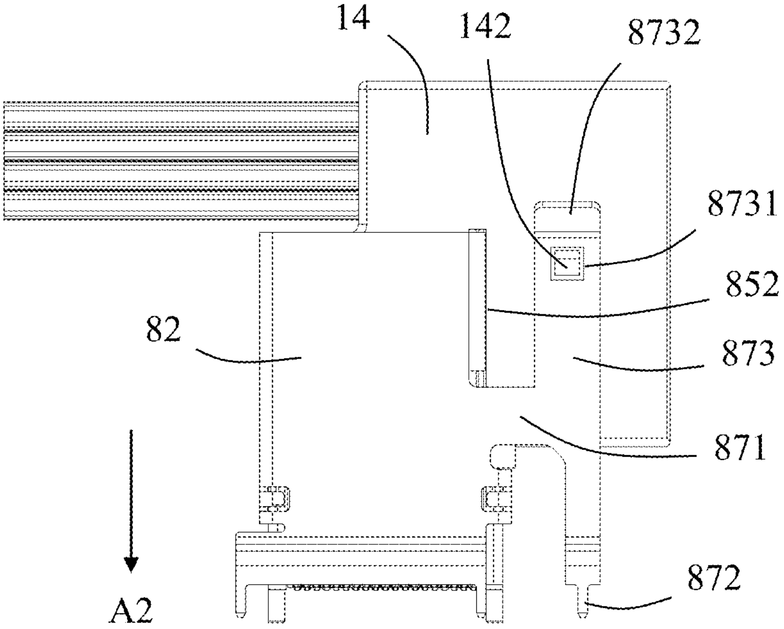
FIG. 12 is a left side view of FIG. 11.

Referring to FIGS. 11 and 12, a connector assembly in a first embodiment is disclosed. Differences from the connector assembly in the first embodiment include that: in the second embodiment of the connector assembly of the present disclosure, the metal shell 8 further includes a second elastic locking arm 873 extending upwardly from the second extension portion 871. In the illustrated embodiment of the present disclosure, the first elastic locking arm 863 and the second elastic locking arm 873 are symmetrically arranged on opposite sides of the first connector 100. The second elastic locking arm 873 has a cantilever shape, and includes a second locking hole 8731 and a second inclined portion 8732 located at a free end (i.e., a top end) of the second elastic locking arm 873. The second side wall 14 includes a second locking protrusion 142 protruding away from the first side wall 14. The second locking protrusion 142 and the first locking protrusion 132 are symmetrically arranged on opposite sides of the first insulating body 1. The first locking protrusion 132 and the second locking protrusion 142 are locked with the first elastic locking arm 863 and the second elastic locking arm 873, respectively, in order to prevent the first connector 100 from being improperly separated from the second connector 200 in the direction opposite to the second direction A2, thereby improving the mating reliability of the first connector 100 and the second connector 200.

Figure 13:
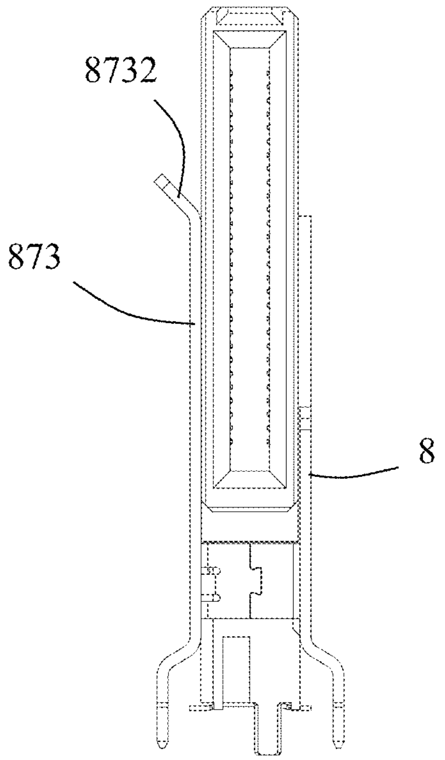
FIG. 13 is a front view of the connector assembly in accordance with a third embodiment of the present disclosure.
Figure 14:
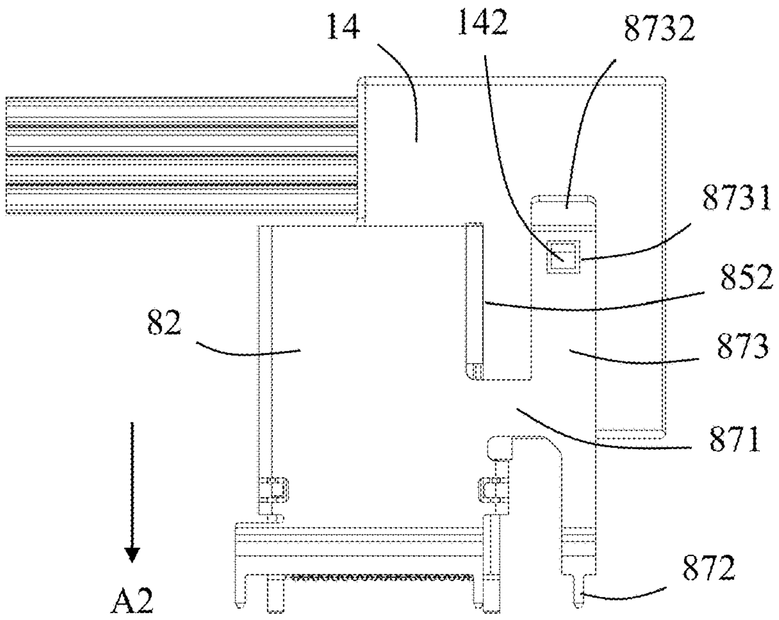
FIG. 14 is a left side view of FIG. 13.
Figure 15:
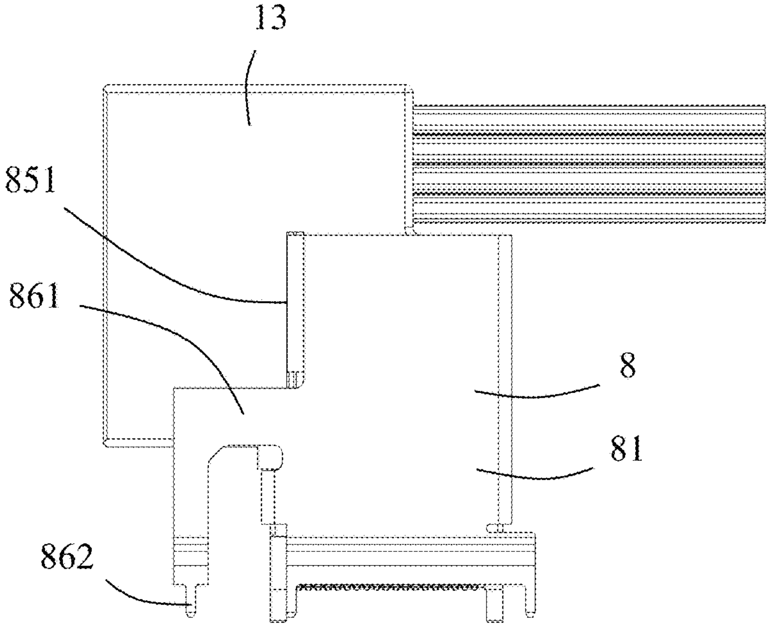
FIG. 15 is a right side view of FIG. 13.
Figure 16:
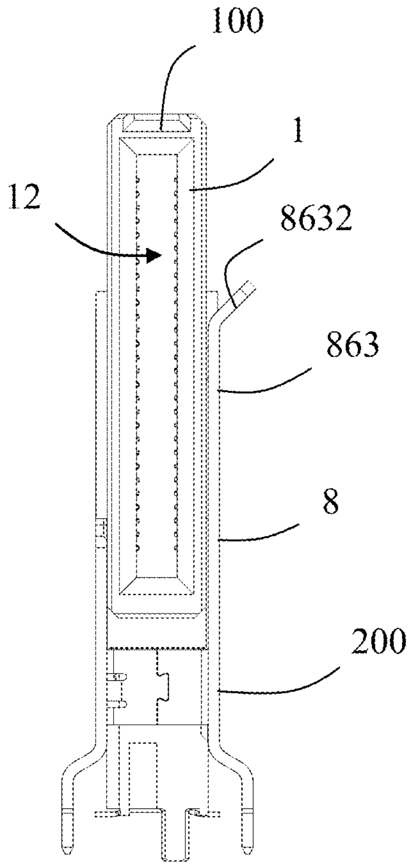
FIG. 16 is a front view of the connector assembly in accordance with a fourth embodiment of the present disclosure.
Figure 17:
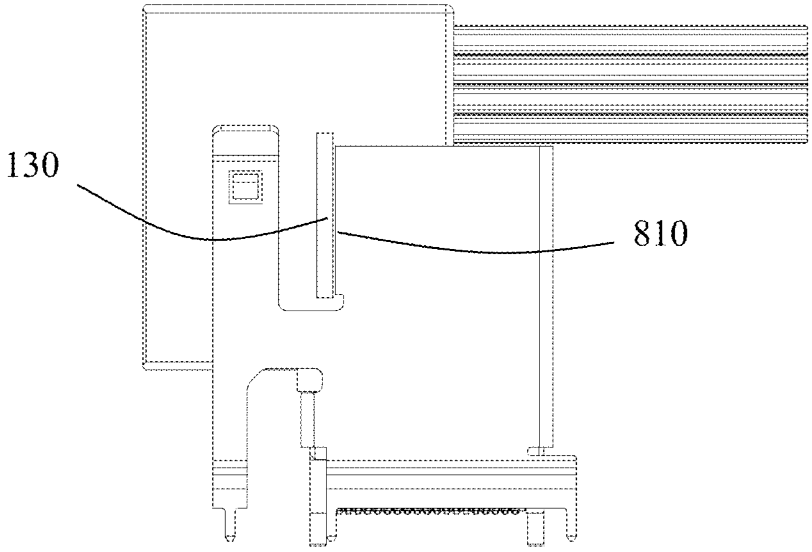
FIG. 17 is a right side view of FIG. 16.
Figure 18:
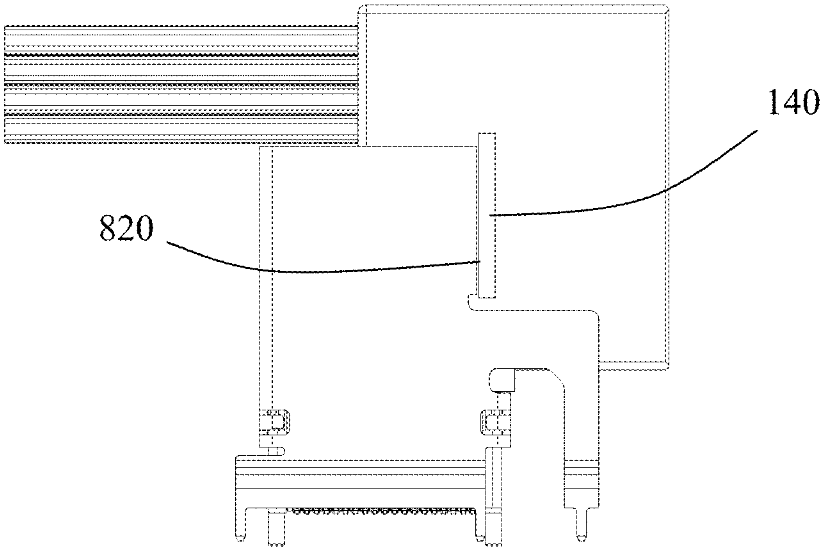
FIG. 18 is a left side view of FIG. 16.
Figure 19:
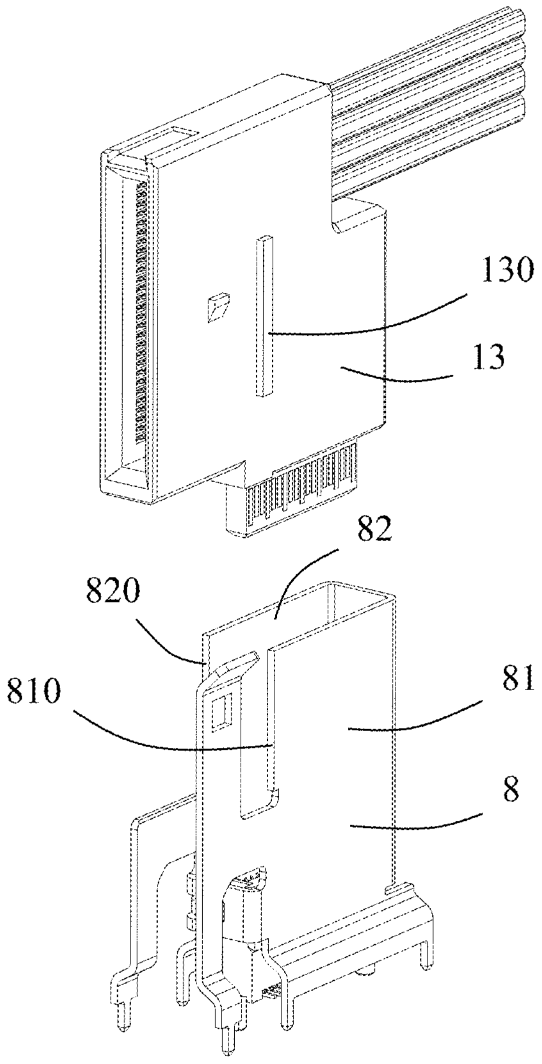
FIG. 19 is a partial exploded perspective view of the connector assembly of the present disclosure in the fourth embodiment, in which the first connector and the second connector are separated from each other.
Figure 20:
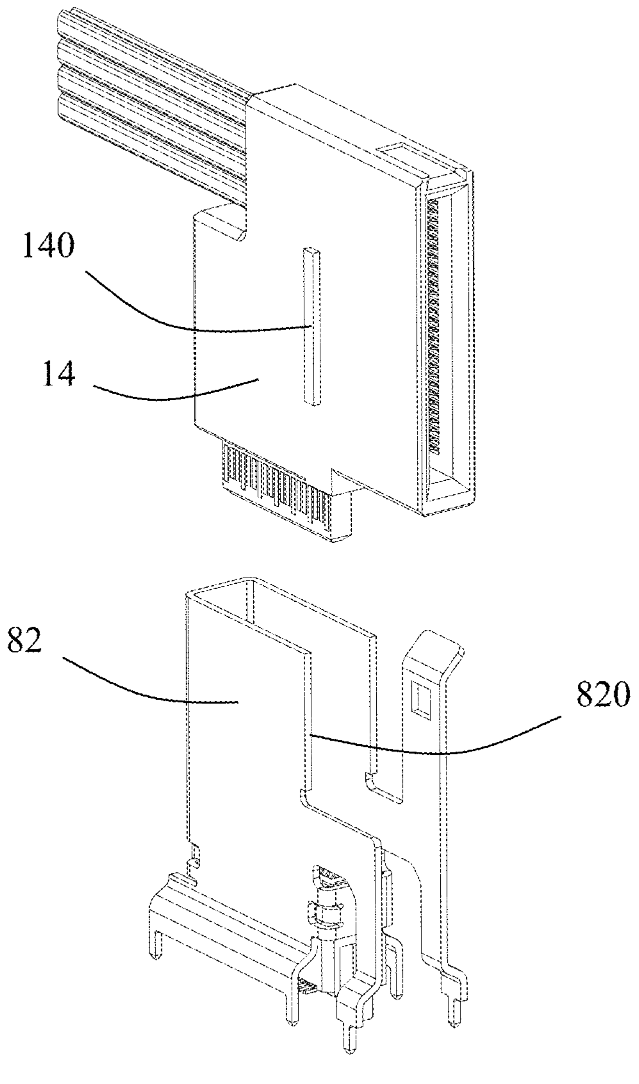
FIG. 20 is a partially exploded perspective view of FIG. 19 from another angle.

Referring to FIGS. 13 to 15, a connector assembly in a third embodiment is disclosed. Differences from the connector assembly in the second embodiment include that: in the third embodiment of the connector assembly of the present disclosure, the metal shell 8 is not provided with the first elastic locking arm 863 in FIG. 11. Correspondingly, the first insulating body 1 is not provided with the first locking protrusion 132.

Referring to FIGS. 16 to 20, a connector assembly in a fourth embodiment is disclosed. Differences from the connector assembly in the first embodiment include that: in the fourth embodiment of the connector assembly of the present disclosure, the metal shell 8 is not provided with the first tab 851 and the second tab 852. The first wall portion 81 includes a first stop surface 810. The second wall portion 82 includes a second stop surface 820. The first stop surface 810 and the second stop surface 820 are located on a side away from the connecting portion 83. Correspondingly, the first side wall 13 of the first connector 100 includes a first protrusion 130. The second side wall 14 of the first connector 100 includes a second protrusion 140. The first protrusion 130 and the second protrusion 140 extend in a direction parallel to the second direction A2. When the first connector 100 is mated with the second connector 200, the first protrusion 130 and the second protrusion 140 are mated with the first stop surface 810 and the second stop surface 820 along a direction parallel to the second direction A2. When the first connector 100 and the second connector 200 are mated in position, the first stop surface 810 and the second stop surface 820 can limit the first protrusion 130 and the second protrusion 140, respectively, to prevent the first connector 100 from excessively pushing the second connector 200 along the first direction A1.

Compared with the prior art, through the interlocking locking structures of the first connector 100 and the second connector 200, the first connector 100 can be prevented from detaching from the second connector 200 in the direction opposite to the second direction A2, thereby improving the mating reliability of the first connector 100 and the second connector 200. The locking structures include an elastic locking arm and a locking protrusion which cooperate with each other, wherein the elastic locking arm is a broader concept of the first elastic locking arm 863 and the second elastic locking arm 873; the locking protrusion is a broader concept of the first locking protrusion 132 and the second locking protrusion 142. In the illustrated embodiment of the present disclosure, the locking protrusion is provided on the first connector 100, and the elastic locking arm is provided on the second connector 200. Of course, in other embodiments, the locking protrusion can also be provided on the second connector 200, and the elastic locking arm can be provided on the first connector 100, which can also achieve the function of the locking structures.

In addition, the first connector 100 and the second connector 200 further include resisting structures which are mated with each other in a direction parallel to the second direction A2. The resisting structures can play a role of limiting the position, which prevents the first connector 100 from excessively pushing the second connector 200 along the first direction A1. In some embodiments of the present disclosure, the resisting structures include a slot and a tab which cooperate with each other, wherein the slot is a broader concept of the first slot 131 and the second slot 141, and the tab is a broader concept of the first tab 851 and the second tab 852. In other embodiments of the present disclosure, the resisting structures include a stop surface and a protrusion which cooperate with each other, wherein the stop surface is a broader concept of the first stop surface 810 and the second stop surface 820, and the protrusion is a broader concept of the first protrusion 130 and the second protrusion 140.

The above embodiments are only used to illustrate the present disclosure and not to limit the technical solutions described in the present disclosure. The understanding of this specification should be based on those skilled in the art. Descriptions of directions, such as "front", "back", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A connector assembly, comprising: a first connector and a second connector which are configured to mate with each other;

the first connector comprising:

- a first insulating body, the first insulating body comprising a first mating surface and a first mating slot extending through the first mating surface along a first direction, the first mating slot being configured to receive a mating element along a mating direction which is opposite to the first direction;
- a plurality of first conductive terminals, each first conductive terminal comprising a first elastic arm and a first tail portion, the first elastic arm comprising a first mating portion extending into the first mating slot to be electrically connected with the mating element; and
- an adapter circuit board, the adapter circuit board comprising an input end and an output end, the input end comprising an input portion electrically connected to the first tail portions of the first conductive terminals, the output end comprising an insertion portion protruding beyond the first insulating body along a second direction which is perpendicular to the first direction; the output end further comprising an output portion and a plurality of cables directly or indirectly electrically connected with the output portion;

the second connector comprising:

a second insulating body, the second insulating body comprising a second mating surface and a second mating slot extending through the second mating surface, the insertion portion being configured to be inserted into the second mating slot along the second direction;

a plurality of second conductive terminals, each second conductive terminal comprising a second mating portion extending into the second mating slot, the second mating portion being configured to electrically contact with the insertion portion; and a metal shell, the metal shell at least partially covering the second insulating body, the metal shell comprising a first wall portion, a second wall portion located opposite to the first wall portion, a third wall portion, a fourth wall portion located opposite to the third wall portion, and a receiving cavity formed by the first wall portion, the second wall portion, the third wall portion and the fourth wall portion; the receiving cavity being in communication with the second mating slot to at least partially receive the first connector;

wherein when the first connector and the second connector are mated with each other, the plurality of cables extend beyond the third wall portion along the mating direction; and the first insulating body extends beyond the fourth wall portion along the first direction with the first mating surface protruding out of fourth wall portion along the first direction; and wherein the first connector and the second connector further comprise locking structures which are lockable with each other to prevent the first connector from detaching from the second connector in a direction opposite to the second direction.

2. The connector assembly according to claim 1, wherein the mating element is an electronic card.

3. The connector assembly according to claim 1, wherein the metal shell comprises at least one tab, the first insulating body defines at least one slot, and the at least one tab is received in the at least one slot along the second direction to prevent the first connector from being tilted with respect to the second connector, subject to an insertion force of the mating element along the mating direction and/or a gravity of the plurality of cables extending beyond the third wall portion along the mating direction.

4. The connector assembly according to claim 3, wherein the at least one tab comprises a first tab and a second tab which are provided on the fourth wall portion; the first tab is bent from the first wall portion; the second tab is bent from the second wall portion; the fourth wall portion further defines an opening slot located between the first tab and the second tab;

when the first connector and the second connector are mated with each other, the first insulating body is stuck in the opening slot.

5. The connector assembly according to claim 4, wherein the at least one slot comprises a first slot and a second slot which are provided on two opposite side walls of the first insulating body, respectively; the first tab is held in the first slot, and the second tab is held in the second slot.

6. The connector assembly according to claim 1, wherein the locking structures comprise a locking hole and a locking protrusion, one of the locking hole and the locking protrusion is provided on the first connector, a remaining one of the locking hole and the locking protrusion is provided on the second connector, the locking protrusion is configured to be locked in the locking hole.

7. The connector assembly according to claim 6, wherein the locking protrusion comprises a first locking surface and a first guiding surface; the first guiding surface is an inclined guiding surface for guiding insertion of the second connector during insertion.

8. The connector assembly according to claim 1, wherein the first connector and the second connector further comprise resisting structures which are mated with each other in a direction parallel to the second direction; and wherein the resisting structures are capable of playing a limiting role in order to prevent the first connector from excessively pushing the second connector along the first direction.

9. The connector assembly according to claim 8, wherein the resisting structures comprise a protrusion provided on the first connector and a stop surface provided on the second connector, and the stop surface is configured to abut against the protrusion so as to limit the protrusion.

10. The connector assembly according to claim 9, wherein the protrusion is provided on the first insulating body, and the stop surface is provided on the metal shell.

11. The connector assembly according to claim 1, wherein the input portion comprises a plurality of first conductive pads for electrically connecting with the first conductive terminals; and the insertion portion comprises a plurality of second conductive pads for electrically contacting the second conductive terminals.

12. A connector assembly, comprising: a first connector and a second connector configured to mate with each other;

the first connector comprising:

a first insulating body, the first insulating body defining a first mating slot configured to receive an electronic card;

a plurality of first conductive terminals, each first conductive terminal comprising a first mating portion extending into the first mating slot to mate with the electronic card; and an adapter circuit board, the adapter circuit board comprising an input end and an output end, the input end comprising an input portion electrically connected to the first conductive terminals, the output end comprising an insertion portion, an output portion and a plurality of cables, the cables being directly or indirectly electrically connected with the output portion in order to transmit high-speed signals;

the second connector comprising:

a second insulating body, the second insulating body defining a second mating slot to receive the insertion portion; and a plurality of second conductive terminals, each second conductive terminal comprising a second mating portion extending into the second mating slot, the second mating portion being in electrical contact with the insertion portion in order to transmit non-high-speed signals;

wherein the first connector and the second connector further comprise locking structures mated with each other, the locking structures comprise a locking hole and a locking protrusion, one of the locking hole and the locking protrusion is provided on the first connector, a remaining one of the locking hole and the locking protrusion is provided on the second connector, the locking protrusion is lockable in the locking hole;

wherein the second connector comprises a metal shell at least partially covering the second insulating body; the metal shell comprises a first wall portion, a second wall portion located opposite to the first wall portion, a third wall portion, a fourth wall portion located opposite to the third wall portion, and a receiving cavity formed by the first wall portion, the second wall portion, the third wall portion and the fourth wall portion; the receiving cavity is in communication with the second mating slot to at least partially receive the first connector;

wherein the electronic card is configured to be inserted into the first mating slot along a mating direction;

wherein the fourth wall portion comprises a first tab bent from the first wall portion, a second tab bent from the second wall portion and an opening slot located between the first tab and the second tab;

when the first connector and the second connector are mated with each other, the plurality of cables extend beyond the third wall portion along the mating direction; and the first insulating body is stuck in the opening slot and extends beyond the fourth wall portion along a first direction which is opposite to the mating direction.

13. The connector assembly according to claim 12, wherein the first insulating body defines a first slot and a second slot provided on two opposite side walls of the first insulating body, respectively; the first tab is held in the first slot, and the second tab is held in the second slot.

14. The connector assembly according to claim 12, wherein the locking protrusion comprises a first locking surface and a first guiding surface; the first guiding surface is an inclined guiding surface for guiding insertion of the second connector during insertion.

15. The connector assembly according to claim 12, wherein the first connector and the second connector further comprise resisting structures which are mated with each other in a direction perpendicular to the first direction; and wherein the resisting structures are capable of playing a limiting role in order to prevent the first connector from excessively pushing the second connector along the first direction.

16. The connector assembly according to claim 15, wherein the resisting structures comprise a protrusion provided on the first connector and a stop surface provided on the second connector, and the stop surface is configured to abut against the protrusion so as to limit the protrusion.

17. The connector assembly according to claim 16, wherein the protrusion is provided on the first insulating body, and the stop surface is provided on the metal shell.

18. A connector assembly, comprising: a first connector and a second connector configured to mate with each other;

the first connector comprising:

a first insulating body, the first insulating body defining a first mating slot configured to receive an electronic card;

a plurality of first conductive terminals, each first conductive terminal comprising a first mating portion extending into the first mating slot to mate with the electronic card; and an adapter circuit board, the adapter circuit board comprising an input end and an output end, the input end comprising an input portion electrically connected to the first conductive terminals, the output end comprising an insertion portion, an output portion and a plurality of cables, the cables being directly or indirectly electrically connected with the output portion in order to transmit high-speed signals;

the second connector comprising:

a second insulating body, the second insulating body defining a second mating slot to receive the insertion portion; and a plurality of second conductive terminals, each second conductive terminal comprising a second mating portion extending into the second mating slot, the second mating portion being in electrical contact with the insertion portion in order to transmit non-high-speed signals;

wherein the first connector and the second connector further comprise locking structures mated with each other, the locking structures comprise a locking hole and a locking protrusion, one of the locking hole and the locking protrusion is provided on the first connector, a remaining one of the locking hole and the locking protrusion is provided on the second connector, the locking protrusion is lockable in the locking hole;

wherein the second connector comprises a metal shell at least partially covering the second insulating body; the metal shell comprises a first wall portion, a second wall portion located opposite to the first wall portion, a third wall portion, a fourth wall portion located opposite to the third wall portion, and a receiving cavity formed by the first wall portion, the second wall portion, the third wall portion and the fourth wall portion; the receiving cavity is in communication with the second mating slot to at least partially receive the first connector;

wherein the third wall portion is configured to limit the first connector from being tilted with respect to the second connector, subject to an insertion force of the electronic card along a mating direction and/or a gravity of the plurality of cables extending beyond the third wall portion along the mating direction.

* * * * *